Patented Jan. 13, 1953

2,625,074

UNITED STATES PATENT OFFICE 2,625,074

PHOTOGRAMMETRICAL PLOTTING PROJECTOR APPARATUS FOR RADIAL NADIR POINT TRIANGULATION

Umberto Nistri, Rome, Italy

Application November 15, 1949, Serial No. 127,414
In Italy February 1, 1949

6 Claims. (Cl. 88—24)

To effect radial triangulation by means of planimetric air photographs when the nadir distance is nothing or nearly nothing, the principal point is normally assumed as the vertex of the angles which have, as their sides, the directions leading towards the points in the terrain under consideraion. In this case the principal optical axis is considered coincident with the vertical, and the photographs are considered to be coplanar, so that, once they have been oriented in the well-known ways, the intersections of the directions leaving the two limits of the base, that is the principal points of the photographs themselves, towards single points on the terrain which are common to the two images, turn out to be planimetrically located with sufficient approximation.

When, however, the nadir distance is notable, radial principal point triangulation is impossible and recourse must be had to radial nadir point triangulation.

In radial nadir point triangulation, as opposed to the preceding type of triangulation, the radial angles must be referred, not, as previously, to the plane of the photograph, but to the horizontal plane of the terrain being considered, and in order to orient the two photographs it is necessary to rotate their projections around their respective nadir axes, whatever the indication of the principal optical axis of each camera might be.

The object of the present invention is to be able to obtain this possibilty with the use of projectors when the position of the nadir point has been marked, no matter by what means, on the photograph in correspondence with the point on the image of the terrain which coincides with that nadir point.

Figure 1:
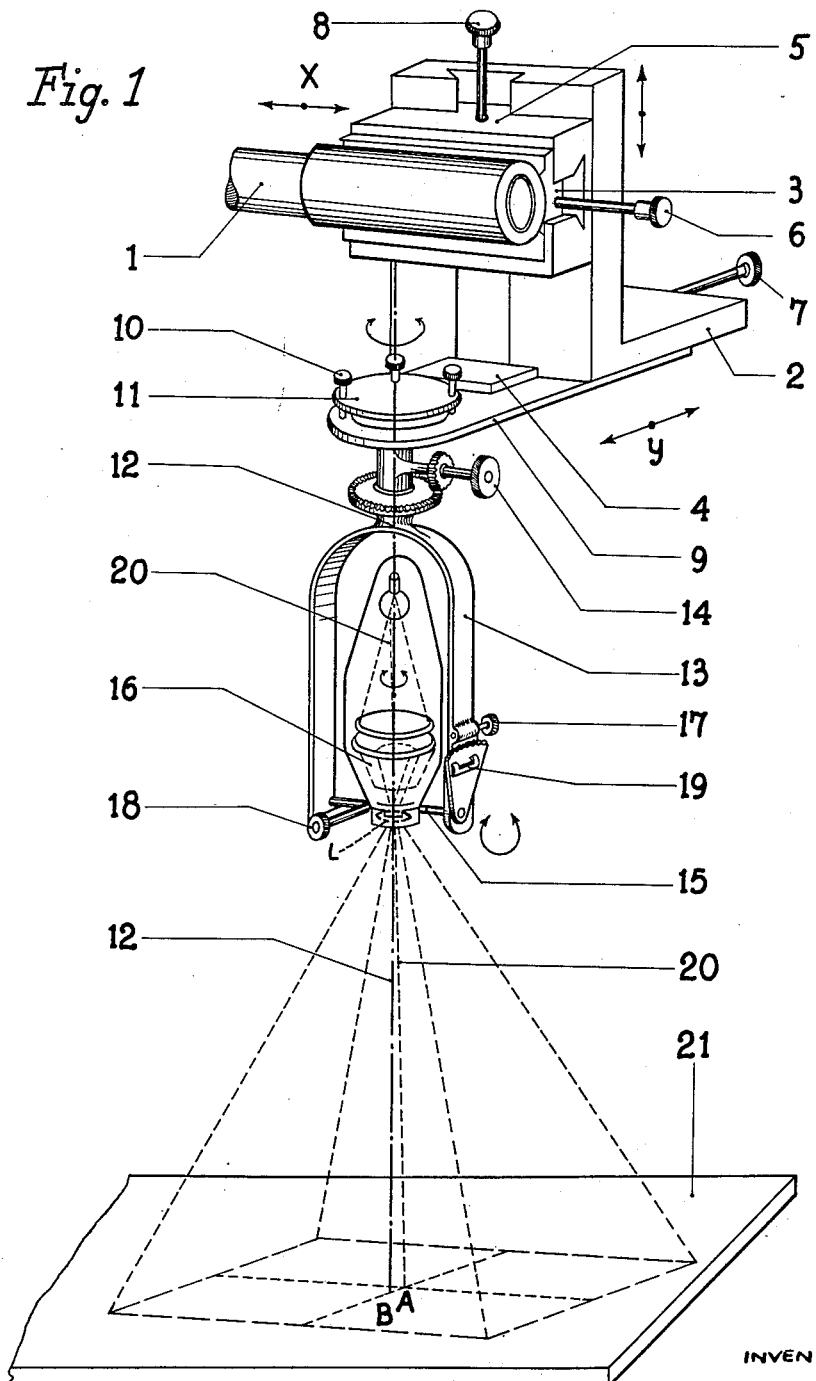
Fig. 1 represents sufficient details of the projector to attain this object.

Bar 1 represents the support common to all the projectors in the gang, and bracket 2 represents, in a schematic form, the individual support of each single projector. It is formed in such a manner as to allow movement of the projector in respect to the bar in the three coordinated orthogonal directions. Each of the three movements is obtained by means of a micrometric screw and by a dovetail slide.

In the figure, 3, 4 and 5 indicate the respective slides of movements X, Y and Z, while 6, 7 and 8 indicate the respective micrometric screws.

Support 11, on which the vertical axis 12 of a member or stirrup 13 is hinged, rests on base 9 of bracket 2 by means of three supporting screws 10 set 120 degrees from each other. Stirrup 13 can rotate around its vertical axis 12 by means of a gear device operated by button 14. Stirrup 13 supports the horizontal axis 15 of a projector 16, whose optical axis 20 rotates around this axis 15 by means of button 17.

The projector can rotate around its own optical axis 20 by means of button 18.

An air bubble levelling device 19 is attached to the sector operated by button 17 and therefore solid with the rotation of the projector around axis 15. This bubble level is so built into the device that when the bubble is centered, the principal axis of the projector 16 is vertical. The horizontal axis of rotation 15 is also set, by construction, at right angles to and, therefore, intersecting the vertical axis of rotation 12, while axis of rotation 12, by construction, passes through axis 15 and the rear nodal point of the projector lens L coincides with this point of intersection of the two axes.

By means of the lowering screws 10, and in the ways well known for adjusting topographical instruments, and by utilizing levelling device 19, it is possible to make the optical axis 20 of the projector and the axis of rotation 12 vertical. When this corrective condition has been attained by the above means, the axes mentioned coincide and are vertical and the two rotations around these axes are equivalent as regards the image projected by the projector on to plane 21.

On the other hand, any inclination given to the optical axis 20 of projector 16 around axis 15, corresponds to a clear differentiation of the objects of the two axes: axis 12 will be the axis of rotation for orienting the image projected onto plane 21, whereas the optical axis 20 of the projector which intersects the vertical axis 12 is the axis around which the image of the photograph must be rotated in order to place the nadir point B and the principal point A on the vertical plane which contains the optical axis of the projector itself. In other words, in order to place the line joining the nadir point to the principal point along the projection of the maximum inclination.

In this manner, once the image of the nadir point has been fixed by any means desired on the same photograph, it is possible, by rotating the projector around the horizontal axis 15 and the optical axis 20, to set the projector itself so that its nadir axis (the line joining the nadir point on the photographic plate with the rear nodal point of the lens) is vertical.

It is then possible, by rotating around axis 12, to orient the image projected on plane 21 so that the four nadir points are projected onto the line joining the two nadir points of the projectors, that is, on the projection of the base.

Figure 2:
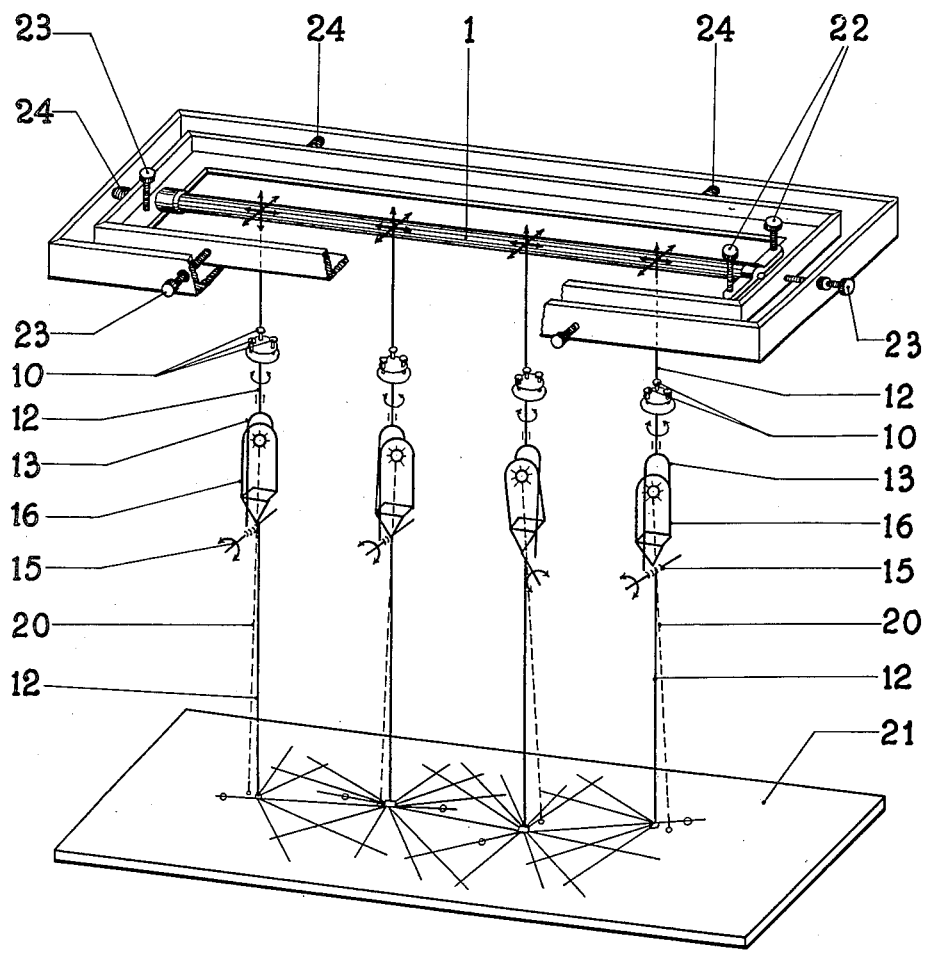
Fig. 2 represents an example of radial nadir point triangulation by means of the device indicated above.

In this manner, repeating the above operations with each projector separately and coupling them two by two, then referring them to points with known positions on the terrain and making the relative corrections by the usual means, it is possible to effect a radial, nadir point triangulation as indicated in Fig. 2.

In order to render the final orientation of the optical model easier and to help in compensations, the supporting bar 1 of the projectors is allowed angular movements within restricted limits by means of lowering screws 22 and movements in the horizontal plane, in longitudinal movement and in rotation by means of screws 23 and return springs 24.

What I claim is:

1. In a photogrammetric plotting apparatus of the multiple projector type, an individual support for each projector, said support comprising a member, means to mount said member for rotation about a vertical axis and passing through the projector lens, means carried by said member to mount said projector for rotation about a horizontal axis intersecting said vertical axis, means carried by said member to mount said projector for rotation about its optical axis, said projector being disposed with its optical axis intersecting said vertical axis, whereby the nadir axis of the projector can be made to coincide with the vertical axis and the image cast by the projector thereupon rotated about said nadir axis.

2. A support as set forth in claim 1 wherein the vertical axis, the horizontal axis and the optical axis of the projector intersect at a common point.

3. A support as set forth in claim 1 wherein the vertical axis, the horizontal axis and the optical axis of the projector intersect at the rear nodal point of the projector lens.

4. A support as set forth in claim 1 wherein the first-named means includes an adjusting mechanism for vertically locating the first-named axis.

5. A support as set forth in claim 1 wherein the first-named means includes an adjusting mechanism for vertically locating the first-named axis, said mechanism constituting a supporting element for the first-named means, said element being carried on three screws equiangularly spaced about said first-named axis.

6. A support as set forth in claim 1 wherein a leveling device is movable with the second-named means.

UMBERTO NISTRI.

REFERENCES CITED

The following references are of record in the file of this patent:

UNITED STATES PATENTS

| Number | Name | Date |
|---|---|---|
| 1,937,711 | Nelles et al. | Dec. 5, 1933 |
| 1,955,116 | Duchatellier | Apr. 17, 1934 |
| 1,980,657 | Bauersfeld | Nov. 13, 1934 |
| 2,079,090 | Von Gruber | May 4, 1937 |
| 2,200,594 | Diggins et al. | May 14, 1940 |
| 2,263,341 | Kurtz | Nov. 18, 1941 |
| 2,309,752 | Cooke | Feb. 2, 1943 |
| 2,451,031 | Kelsh | Oct. 12, 1948 |